US010223830B2

(12) United States Patent
Bonner et al.

(10) Patent No.: US 10,223,830 B2
(45) Date of Patent: Mar. 5, 2019

(54) COMPUTER-IMPLEMENTED METHOD FOR DESIGNING A MANUFACTURABLE GARMENT

(71) Applicant: Dassault Systemes, Velizy Villacoublay (FR)

(72) Inventors: David Leo Bonner, Sevres (FR); Auxkin Ortuzar Del Castillo, Saint-Cloud (FR); Denis Nouais, Clamart (FR)

(73) Assignee: Dassault Systemes, Velizy Villacoublay (FR)

( * ) Notice: Subject to any disclaimer, the term of this patent is extended or adjusted under 35 U.S.C. 154(b) by 206 days.

(21) Appl. No.: 15/271,587

(22) Filed: Sep. 21, 2016

(65) Prior Publication Data

US 2017/0109926 A1    Apr. 20, 2017

(30) Foreign Application Priority Data

Oct. 16, 2015   (EP) ..................................... 15306659

(51) Int. Cl.
*G06T 17/20* (2006.01)
*G06T 19/00* (2011.01)
(Continued)

(52) U.S. Cl.
CPC ............. *G06T 17/20* (2013.01); *A41H 3/007* (2013.01); *G06F 17/50* (2013.01);
(Continued)

(58) Field of Classification Search
CPC ..... A41H 3/007; G06F 17/50; G06F 17/5018; G06F 2217/32; G06F 2217/12; G06T 19/006; G06T 2210/16
See application file for complete search history.

(56) References Cited

PUBLICATIONS

Ji et al. (NPL "Three-dimensional Garment Simulation Based on a Mass-Spring System") Citation: Ji, Feng, Ruqin Li, and Yiping Qiu. "Three-dimensional garment simulation based on a mass-spring system." Textile Research Journal 76.1 (2006): 12-17.*
(Continued)

*Primary Examiner* — Diane M Wills
(74) *Attorney, Agent, or Firm* — Hamilton, Brook, Smith & Reynolds, P.C.

(57) ABSTRACT

A computer-implemented method for designing a manufacturable garment provides a three-dimensional shape representing a garment segmented into a set of three-dimensional panels (3DP). Next the method computes for each three-dimensional panel, a corresponding flattened pattern (FP). The method defines a mesh (MF, M3D) on each of said three-dimensional panels and flattened patterns; and simulates a draping of the segmented three-dimensional shape over a three-dimensional manikin (MK) by progressively imposing a constraint that each mesh element (ME3) of said three-dimensional panels adopts dimensions (EEL) of a corresponding mesh element (MEF) of the corresponding flattened pattern while it conforms to the manikin shape. A computer program product, a non-volatile computer-readable data-storage medium and a Computer Aided Design system may carry out such a method. Also application of such a method to the manufacturing of a real garment.

14 Claims, 5 Drawing Sheets

(51) Int. Cl.
*A41H 3/00* (2006.01)
*G06F 17/50* (2006.01)

(52) U.S. Cl.
CPC ........ *G06F 17/5018* (2013.01); *G06T 19/006* (2013.01); *G06F 2217/12* (2013.01); *G06F 2217/32* (2013.01); *G06T 2210/16* (2013.01)

(56) References Cited

PUBLICATIONS

Julius et al. (NPL "D-Charts: Quasi-Developable Mesh Segmentation") Citation: Julius, Dan, Vladislav Kraevoy, and Alla Sheffer. "D-Charts: Quasi-Developable Mesh Segmentation." Computer Graphics Forum. vol. 24. No. 3. Blackwell Publishing, Inc., 2005.*

Sheffer et al. (NPL "ABF++: Fast and Robust Angle Based Flattening"). Citation: Sheffer, Alla, et al. "ABF++: fast and robust angle based flattening." ACM Transactions on Graphics (TOG) 24.2 (2005): 311-330.*

Wenxi, Li (NPL "Automatic Tailoring and Cloth Modelling for Animation Characters"). Citation: Wenxi, Li, Thesis "Automatic Tailoring and Cloth Modelling for Animation Characters", Bournemouth University, Jun. 2014.*

Meng, Yuwei, et al. "Computer aided clothing pattern design with 3D editing and pattern alteration", Computer Aided Design, Elsevier Publishers BV., Barking, GB, vol. 44, No. 8, Mar. 15, 2012 (Mar. 15, 2012), pp. 721-734, XP028486780, ISSN: 0010-4485, DOI : 10.1 016/J.CAD.2012.03.006 [retrieved on Mar. 23, 2012].

Liu, Yong-Jin, et al. "A survey on CAD methods in 3D garment design", Computers in Industry, Elsevier Science Publishers. Amsterdam, NL, vol. 61, No. 6, Aug. 1, 2010 (Aug. 1, 2010 ), pp. 576-593, XP027080059, ISSN: 0166-3615, DOI: 10.1016/J.COMPIND.2010. 03.007 [retrieved on Jun. 8, 2010].

Geng, Yu-lei, et al. "Sketch based garment modeling on an arbitrary view of a 3D virtual human model". Journal of Zhejiang University. Science C, vol. 12, No. 3, Mar. 1, 2011 (Mar. 1, 2011), pp. 195-203, XP055264659, Heidelberg ISSN: 1869-1951, DOI: 10.1631/jzus. C1000049.

European Search Report, European Counterpart Application No. EP 15 30 6659, Date of Completion of Search: Apr. 13, 2016, 11 pages.

\* cited by examiner

COMPUTER-IMPLEMENTED METHOD FOR DESIGNING A MANUFACTURABLE GARMENT

RELATED APPLICATION(S)

This application claims priority under 35 U.S.C. § 119 or 365 to Europe, Application No. 15306659.2, filed Oct. 16, 2015. The entire teachings of the above application(s) are incorporated herein by reference.

BACKGROUND

The invention relates to the field of Computer-Aided Design. More precisely, it concerns a computer-implemented method for defining a manufacturable garment, i.e. a garment which can be obtained by seaming together, by their edges, a finite number of developable (flattenable) panels, usually made of fabric or another suitable flexible material, e.g. leather. It also concerns a Computer-Aided Design (CAD) system, computer program product and a non-volatile computer-readable data-storage medium containing computer-executable instructions to cause a computer system to carry out such a method, as well as a method of manufacturing a garment.

The invention applies to the design of both garments to be manufactured in the real world and of realistic "virtual" garments for integration to virtual worlds, e.g. in video games or animated movies.

According to the conventional method of designing a garment, the designer starts from a mental or graphical representation of the garment worn by a model or a manikin; then he or she has to figure out and design a set of planar patterns which, when assembled, will yield the desired visual result. A prototype is then manufactured and, if necessary, the pattern design is corrected iteratively. This method is labor-intensive, lengthy and requires significant skill and experience from the designer.

Hereafter, the word "pattern" will designate a piece of fabric, leather or other flexible material suitable to be used to manufacture a garment. A garment is most often manufactured by assembling several patterns by their edges. Patterns are usually considered two-dimensional, as they are developable (they can lie flat on a plane) and their thickness is negligible (smaller by at least two orders of magnitude) over their other dimensions.

SUMMARY OF THE INVENTION

Known Computer-Aided Design techniques provide some help to the garment designer.

For instance, software tools such as MarvelousDesigner (www.marvelousdesigner.com) require the user to design a set of flat patterns, arrange them around a manikin or avatar (i.e. a virtual representation of a human body) and manually define seams between them. Then, the software assembles the patterns and drapes them onto the manikin, providing a three-dimensional digital model of the prototype. The user must still have considerable experience in the art of clothes design in order to be able to devise a set of flat patterns suitable to form a garment having the required three-dimensional shape; even in this case, his or her creativity is heavily constrained to garment shapes for which suitable patterns can be easily designed. Moreover, manually arranging the patterns around the manikin and defining the seams are tedious and time-consuming operations and they require the execution, by the CAD system, of a "seam closing" phase, before the garment is actually in a position to drape by physical forces (gravity, wind) onto the manikin. The seam closing phase is problematic and costly because it involves large forces to pull the seams shut. Furthermore, in the simulation algorithm, this involves transition from the "seam closing" phase, which is purely artificial (gravity is usually switched off), to the "draping" phase which is physically realistic.

The "3D flattener" software tool by Optitex Ltd allows the user to draw three-dimensional panels around a manikin, and then converts them into flat patterns. This is only suitable to the design of tight-fitting garments such as underwear or swimsuits.

Several academic papers disclose methods for sketching three-dimensional digital models of garments ("virtual garments"), but without enforcing manufacturability constraints. Otherwise stated, it cannot be ensured that the virtual garments obtained by applying these methods can be decomposed into developable panels. Therefore they are of little use in designing garments to be manufactured in the real world and, in virtual-reality applications, they may lead to the design of unrealistic virtual garments. See e.g.

- Zahraa Yasseen, Ahmad Nasri, Pascal Volino, Nadia Magnenat-Thalmann, Wajih Boukaram "Towards Sketched-based Garment Design and Animation" Computer Graphics International, Conference, June 2010, Singapore.
- Emmanuel Turquin, Marie-Paule Cani, John Hughes, "Sketching garments for virtual characters", John F. Hughes and Joaquim A. Jorge. Eurographics Workshop on Sketch-Based Interfaces and Modeling, December 2003, Grenoble, France.
- Emmanuel Turquin, Jamie Wither, Laurence Boissieux, Marie-Paule Cani, John F. Hughes. "A sketch-based interface for clothing virtual characters". IEEE Computer Graphics and Applications, Institute of Electrical and Electronics Engineers (IEEE), 2007, 27 (1), pp. 72-81.
- Yu-lei Geng, Jin Wang, Guo-dong Lu, Zheng Liu, Gang Chen, "Sketch based garment modeling on an arbitrary view of a 3D virtual human model", Journal of Zhejiang University SCIENCE C, March 2011, Volume 12, Issue 3, pp 195-203.

The invention aims at overcoming the limitations of the prior art discussed above. More precisely it aims at providing a CAD tool allowing the complete design of garments such that they can be both simulated in a virtual world and manufactured in the real world, allowing the designer to conduct many iterations of draping in the virtual world, and invest in a real prototype or series run only when he or she is fairly confident that the design is a good one. Since it cannot be guess which iteration of the virtual world garment will be considered adequate for real world fabrication, every iteration should yield a set of valid manufacturable two-dimensional (2D) patterns.

Hereafter, a "three-dimensional" object will be an object—or a digital model thereof—allowing a three-dimensional representation, which allows the viewing of the parts from all angles.

The invention solves this problem by allowing a designer to provide a freeform three-dimensional (3D) shape modeling a garment, with or without indications of the decomposition into cloth panels, by automatically generating a set of manufacturable (and therefore 2D) cloth patterns and by performing a draping simulation on a support such as a manikin, referring directly to the 3D modeled garment and without recourse to positioning of flat patterns around the support to initialize the draping process.

From a creative design perspective, the inventive approach liberates from previous knowledge of garment design; a designer can trace a 3D surface on purely aesthetic principles and discover, by trial and error, if it converts or not into a satisfying sewn garment. For example, if the designer traces a shape in such a way that there is strong double curvature inside one given panel (i.e. the panel is neither developable non "almost developable", i.e. flattenable with small deformations), the system will produce a draped shape that has many folds in it, these folds intervening naturally because of the impossibility of flattening double curvature without strong deformation; the effect might be judged unpleasant, or on the contrary might be very much pleasing. The system does not limit the designer, but rather allows he or she to design anything, and see if it makes sense or not from a functional and aesthetic standpoint. Moreover, the tedious positioning of the panels prior to draping is eliminated, and computational efficiency is improved by making the seam closing phase unnecessary, as the cloth panels are initialized in a closed-seam layout.

The paper by Melina Skouras, Bernhard Thomaszewski, Peter Kaufmann, Akash Garg, Bernd Bickel, Eitan Grinspun, Markus Gross, "Designing Inflatable Structures", ACM Conference on Computer Graphics & Interactive Techniques (SIGGRAPH) 2014—Aug. 10-14, 2014, discloses a method for automatically designing a set of flat patterns forming an inflatable structure whose shape, once inflated, is as close as possible to a target. This problem, however, is significantly different from garment design. The main force acting on garments is gravity, which is not strong enough to introduce significant deformation, therefore the fabric patterns forming a garment remain quasi-developable; in inflatable structure, instead, pressure is high creating large areas of double curvature (i.e. non developable). Moreover, wrinkling (i.e. folding behavior) is important for garments but limited to small areas in inflatable structures. Also, designing an inflatable structure aims at reproducing a target three-dimensional shape as accurately as possible, while garment design takes into account two different reference shapes: the free-shape imagined by the designer and the manikin onto which the garment has to be draped.

An object of the present invention, allowing achieving this aim is a computer-implemented method for designing a manufacturable garment comprising the steps of:
  a) providing a digitally modeled three-dimensional shape representing a garment, segmented into a set of three-dimensional panels, each of said three-dimensional panels being homeomorphic to a planar shape;
  b) computing, for each of said three-dimensional panels, a corresponding two-dimensional flattened pattern, and defining a bijection between points of each three-dimensional panel and of the corresponding two-dimensional flattened pattern;
  c) defining a mesh on each of said three-dimensional panel and two-dimensional flattened pattern, the meshes on each three-dimensional panels and on the corresponding two-dimensional flattened pattern being related by said bijection; and
  d) simulating a draping of the digitally modeled and segmented three-dimensional shape over a digitally modeled three-dimensional manikin by progressively imposing a constraint that each mesh element of said three-dimensional panels adopts dimensions of a corresponding mesh element of the corresponding two-dimensional flattened pattern while it conforms to the manikin shape.

According to particular embodiments of such a method:
  Step a) may comprise:
    a1) a sub-step of providing a digitally modeled three-dimensional shape representing said garment;
    a2) a sub-step of segmenting said digitally modeled three-dimensional shape into said set of three-dimensional panels.
  Step b) may be carried out automatically by a computer using a method chosen among Angle Based Flattening and Least Squares Conformal Maps.
  Step b) may comprise, after the computing of said two-dimensional flattened patterns, a post-processing sub-step of deforming them by imposing a common length, or a predetermined length ratio, to sides of two-dimensional flattened patterns which correspond to contacting sides of two adjacent three-dimensional panels, representing seams of said garment.
  Said post-processing sub-step may be performed by simulating an elastic deformation of at least some of said two-dimensional flattened patterns while imposing a length value to at least one side of each of said patterns using multi-point constraints.
  Step c) may comprise defining a quadrangular mesh on each of said three-dimensional panels and two-dimensional flattened patterns.
  Step c) may comprise defining a mesh on each of said two-dimensional flattened patterns, then defining a corresponding mesh on the corresponding three-dimensional panel using said bijection.
  Step d) may be carried out automatically by a computer using a constraint-based iterative solver imposing constraints on the lengths of the edges of the mesh elements of said three-dimensional panels.
  Step d) may comprise initializing said constraint-based iterative solver by positioning each said three-dimensional panel on its original position in the digitally modeled three-dimensional shape representing the garment.
  Said constraints on the lengths of edges of mesh elements of said three-dimensional panels may be expressed by length intervals having boundaries which are modified over successive iterations to progressively impose that each of said element edges adopts the length of a corresponding edge of the corresponding two-dimensional flattened pattern.

Another object of the invention is a computer program product, stored on a non-volatile computer-readable data-storage medium, comprising computer-executable instructions to cause a computer system to carry out such a method.

Another object of the invention is a non-volatile computer-readable data-storage medium containing computer-executable instructions to cause a computer system to carry out such a method.

Another object of the invention is a Computer Aided Design system comprising a processor coupled to a memory and a graphical user interface, the memory storing computer-executable instructions to cause the Computer Aided Design system to carry out such a method.

Another object of the invention is a method of manufacturing a garment comprising:
  a step of designing said garment using a method as above;
  a step of physically manufacturing said garment, including cutting and assembling planar patterns corresponding to the flattened two-dimensional patterns.

Another object of the invention is a garment obtained by said method of manufacturing.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Additional features and advantages of the present invention will become apparent from the subsequent description, taken in conjunction with the accompanying drawings, wherein.

DETAILED DESCRIPTION OF THE INVENTION

A description of example embodiments of the invention follows.

Figure 1A:
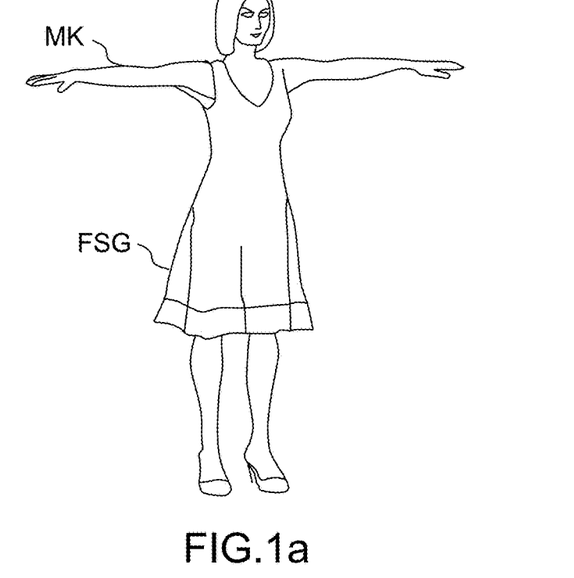
FIGS. 1a to 1e illustrate different steps of a method according to an embodiment of the invention.
Figure 1B:
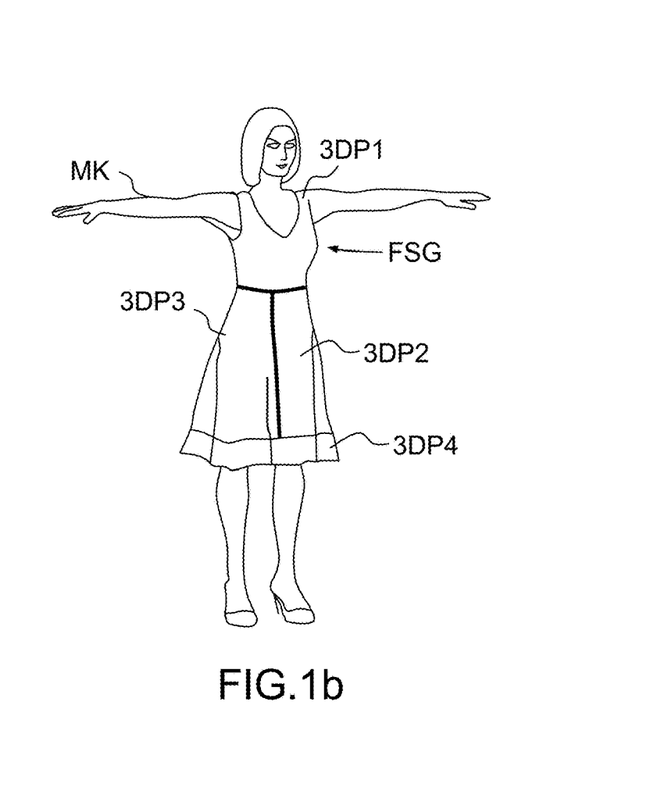
Figure 2:
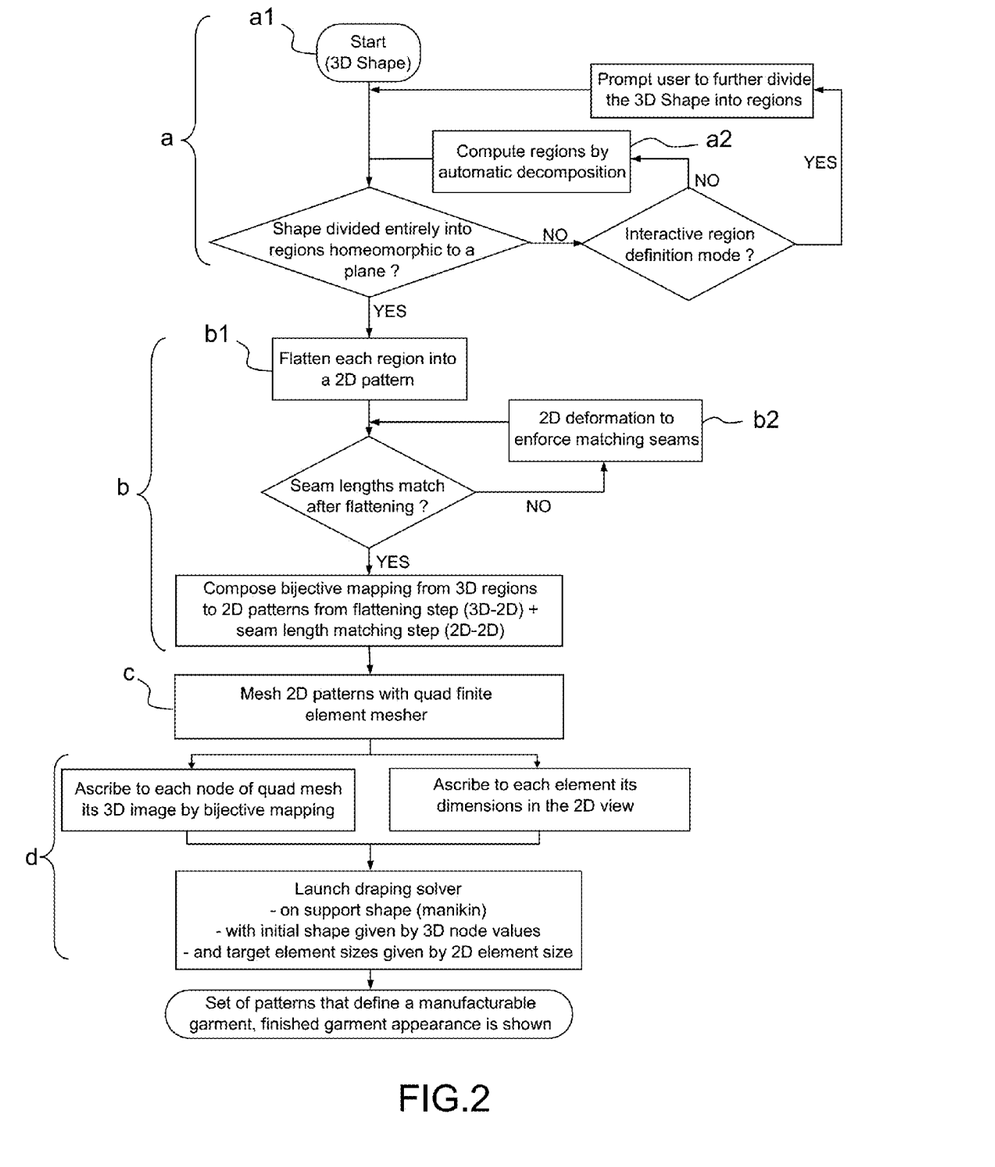
FIG. 2 is a flow-chart of such a method.

As illustrated on FIGS. 1a, 1b and 2, the inventive method begins (step a, sub-step a1 on the flow-chart of FIG. 2) by providing to a CAD system a digitally modeled 3D shape FSG representing a garment. The shape is "free", i.e. it needs not being constrained by any specific manufacturability requirement. The shape can be sketched by the user on a suitable avatar, or digitally-modeled 3D manikin MK, using e.g. one of the techniques described in the above-referenced papers of Zahraa Yasseen et al, Emmanuel Turquin et al, Yu-lei Geng et al. Alternatively it may be imported together with a manikin "wearing" it—from a database or any other source.

The free 3D shape FSG may be already segmented, or not. In the latter case, there are two possibilities: the user may be prompted to perform the segmentation manually, by using suitable interactive graphic tools (known per se); or the CAD system may perform the segmentation automatically (sub-step a2), preferably offering to the user the possibility of modifying the automatically produced segmentation. Several automatic segmentation techniques are known in the art, see e.g.

David Bommes et al. "Integer-Grid Maps for Reliable Quad Meshing", Computer Graphics Forum (Proc. Eurographics 2005), 24(3): 581-590, which generates 4-sided panels; and Dan Julius et al "D-Charts: Quasi-Developable Mesh Segmentation" Eurographics 2005 Volume 24 (2005), Number 3, which tiles a 3D-surface in a regular way.

"Segmentation" means decomposing the 3D shape into a set of regions, or panels, which are homeomorphic to a plane—or more generally to a planar figure possibly including holes. The resulting panels are not necessarily developable—i.e. they may not be flattenable on a plane without distortion; therefore they are intrinsically three-dimensional objects. Adjacent 3D panels have contacting sides, which represent seams of the manufactured garment. FIG. 1b represents the free 3D shape FSG of FIG. 1a segmented; some of the panels are identified by references 3DP1, 3DP2, 3DP3, 3DP4. Other constitutive panels are not visible on the figure.

Figure 1C:
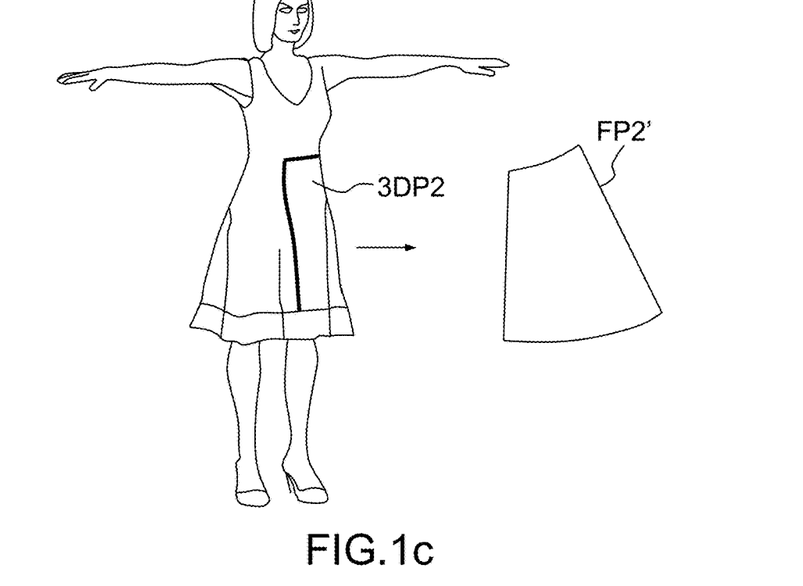

The subsequent step (step b, sub-step b1), implemented by a software module executed by the CAD system which is usually called a "parameterization solver", consists in flattening the 3D panels, to obtain corresponding manufacturable cloth patterns; they can be considered bi-dimensional (2D), even if they are immersed in a 3D virtual space, because they are planar. More precisely this step includes computing, for each of said three-dimensional panels, a corresponding two-dimensional flattened pattern, and defining a bijection between points of each 3D panel and of the corresponding two-dimensional flattened pattern. The flattened patterns do not replace the corresponding 3D panels and they do not need having any defined spatial relationship with each other or the manikin. FIG. 1c shows the flattened pattern FP2' corresponding to the 3D panel 3DP2.

Several flattening algorithms are known in the art and may be applied to the invention; they are generally based on the principle of deforming the 3D panel by distributing the deformation as uniformly as possible. One may cite, for example, the ABF++ algorithm (an improved version of the older ABF—Angle Based Flattening—method), described in the paper by Alla Sheffer, Bruno Lévy, Maxim Mogilnitsky and Alexander Bogomyakov "ABF++: Fast and Robust Angle Based Flattening" ACM Transactions on Graphics (TOG) Volume 24 Issue 2, April 2005, Pages 311-330. Another suitable method is LSCM (Least Square Conformal Maps), which allow a manual intervention from the user; see the paper by Bruno Lévy, Sylvain Petitjean, Nicolas Roy and Jerome Maillot "Least Squares Conformal Maps for Automatic Texture Atlas Generation" ACM Transactions on Graphics (TOG)—Proceedings of ACM SIGGRAPH 2002 Volume 21 Issue 3, July 2002.

These methods require defining a mesh on the panels, which is usually triangular.

Figure 1D:
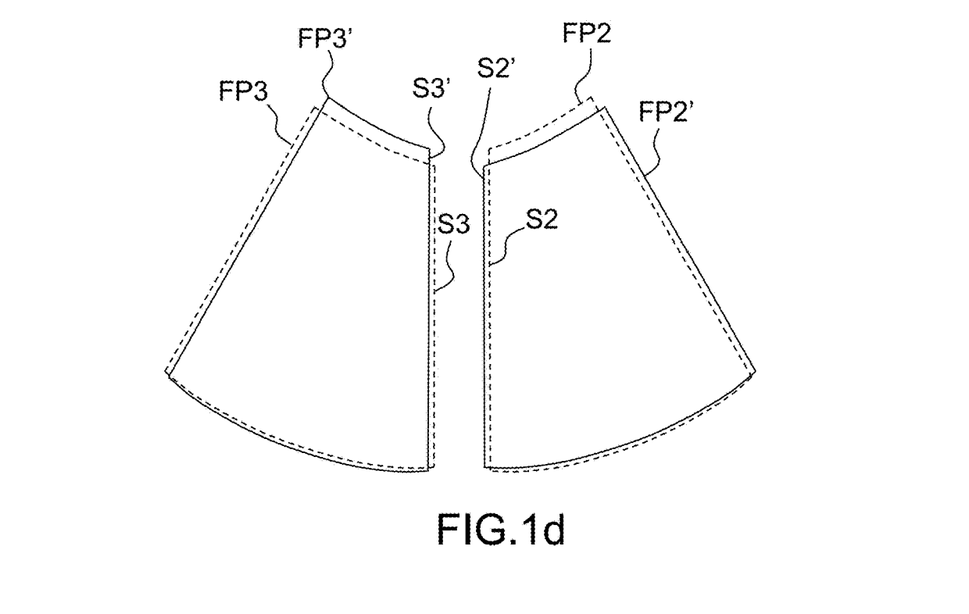

As indicated above, adjacent 3D panels have contacting sides, which represent seams of the manufactured garment (the panels do not necessarily have a polygonal border, so a "side" is broadly defined as a portion of the panel border which is adjacent a same different panel, or which is part of a border of the garment). These contacting sides necessarily have the same length, or at least a fixed relationship between their length (e.g. in the case of a puffed sleeve); but this relationship is generally lost during flattening. A post-process (sub-step b2 on the flow-chart of FIG. 2) is then required to enforce this relationship, and therefore to obtain matching seams. FIG. 1d show two 2D panels FP2', FP3' obtained by flattening two adjacent 3D panels, 3DP2 and 3DP3 respectively. These 2D patterns have respective sides, S2' and S3', which should form a seam but, following the flattening step, are no longer compatible (i.e. have different length). The post-processing step deforms both 2D patterns to enforce the compatibility of these sides; references FP2, FP3 designate the deformed 2D patterns and S2, S3 the sides makes compatible; more precisely, these sides take a length that is the average of the lengths of S2', S3'. Of course, there are other possibilities, for example only one of the patterns may be deformed. It should be understood that FIG. 1d, showing two patterns which are made compatible by changing the length of a single side, is over-simplified for the sake of explanation. In most cases, several flattened patterns will have to be made compatible with each other; therefore, for at least some of the patterns, it will be necessary to modify simultaneously the length of several sides.

The post-process step may be performed by simulating the deformation of an elastic membrane having the initial shape of the 2D pattern when one or more of their sides is stretched or contracted by a factor chosen to enforce the compatibility condition. The simulation may be performed e.g. by the finite element method, which requires defining a mesh on the flattened patterns; it may be possible to use the same mesh already defined to carry out the flattening. However, if several sides have to be stretched or contracted simultaneously, their position cannot be assumed to be fixed. It is possible to solve this problem by applying so-called "multi-point constraints" (MPC), which establish relationships between nodes and degrees of freedom of a mesh. The MPC approach is described e.g. in R. D. Cook, D. S. Malkus M. E. Plesha R. J. Witt Concepts and Applications of Finite Element Analysis, 4th Edition, Wiley (Oct. 17, 2001).

More precisely, it is possible to proceed as follows:

For each side to be stretched or contracted, a "master" point is chosen. The master point may be the centroid of the size, which does not necessarily belong to the side itself.

The length of the side is changed by applying a homothetic transformation having the master point as its center.

The points of the stretched or contracted side are then treated as a rigid body free to move in the plane of the pattern, i.e. with three degrees of freedom, two translations and a rotation. As well as changing the length of the side by stretching or contracting, this mechanism allows also to impose a certain 2D shape on the side: e.g. it can be required that the 2D shape be a straight line for example.

Once the shape of one or more of the sides has been imposed, elimination of free body motion of the pattern is achieved by fixing the position of a point PF (which eliminates the two translational degrees of freedom) and the orientation of an axis (which eliminates the rotational degree of freedom). The orientation of the axis is usually fixed by choosing a node in the pattern as far away as possible from PF on the X axis, and fixing its Y coordinate, or inversely, choosing a point far in Y and fixing its X coordinate. By fixing one coordinate of a point that is far away from the fixed point in the other coordinate, the axis running through the two points is blocked.

The deformation of the pattern is then computed, e.g. by minimizing the elastic deformation energy, while applying these constraints.

Alternatively, it could be possible to impose constraints on the side length during the flattening operation itself.

Then (step c on FIG. 2) a mesh is defined on each flat pattern and, through the bijective relationship determined at step b, on each corresponding 3D panel (it would also be possible to proceed the other way round). Preferably, this mesh is not the same which has been used for flattening the panel and/or imposing the compatibility constraints: while triangular meshes are often preferred for carrying out step b, or at least sub-step b2, the meshes defined at step c are preferably quadrangular. For this particular problem, where edge length constraints are used to model the limited edge extensibility, quadrangular meshes are preferred over triangular ones for two main reasons:

triangular meshes lead to over-constrained problem while quad meshes leave one degree of freedom per vertex in average allowing its transverse motion;

quadrangular meshes better represent the warp and weft of cloth, making the mathematical model closer to the physical reality.

Figure 1E:
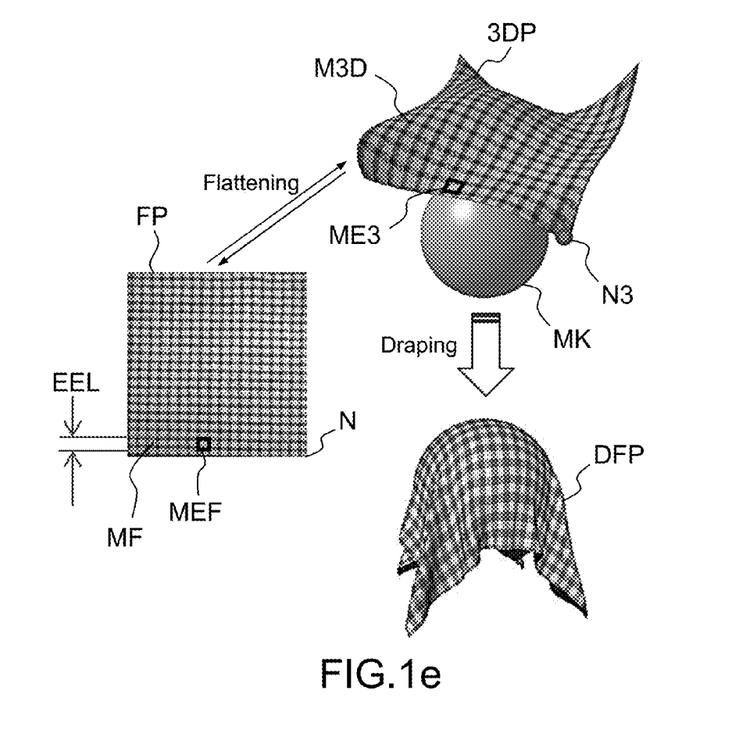

FIG. 1e illustrates this step c and the subsequent step d. For the sake of simplicity, only the case of a single flattened pattern FP and of a corresponding 3D panel 3DP is considered; moreover, the manikin MK is represented by a simple sphere. On this figure, references MF and MEF designate the mesh and a mesh element of the flattened pattern, while M3D and ME3 designate the mesh and the corresponding mesh element on the 3D panel; DFP designated the draped, flattened pattern.

Then, using the mesh defined at step c), the draping of the digitally modeled and segmented 3D "free" shape FSG onto the manikin MK is simulated. Importantly, during the draping, it is imposed that each mesh element ME3 of the three-dimensional panels adopts the dimensions (e.g. edge length EEL, on FIG. 1e) of the corresponding mesh element MEF of the corresponding 2D pattern while it conforms to the manikin shape. Thus, at the end of the draping step, the 3D panels have become dimensionally identical to the flattened patterns, and therefore are developable. Moreover, they are already assembled to form a manufacturable garment, whose draping is realistically simulated.

This step (labeled as d on the flow-chart of FIG. 2) may be implemented as follows.

For each node N of the quadrangular mesh, a containing triangle T is identified in the flattened pattern. Then, the barycentric coordinates of N in T are computed (these are standard coordinates within a triangle, a+b+c=1) and subsequently multiplied by the corresponding 3D positions of the mesh element ME3 to find N3, which is the image of N in the 3D space of the non-flattened panel. Therefore the 3D image nodes N3 are positioned on the (non developable) shape FSG. Then draping is performed using known algorithms, while progressively imposing a constraint that each mesh element ME3 of said three-dimensional panels adopts the dimensions (e.g. length of the edges of the mesh element EEL) of the corresponding mesh element MEF of the corresponding 2D pattern while it conforms to the manikin shape under the effect of a simulated gravity field.

The draping simulation may be carried out using a constraint-based iterative solver executed by the CAD system, e.g. by implementing the method described in the paper by Rony Goldenthal, David Harmon, Raanan Fattal, Michel Bercovier and Eitan Grinspun "Efficient Simulation of Inextensible Cloth", ACM Transactions on Graphics (TOG)—Proceedings of ACM SIGGRAPH 2007 Volume 26 Issue 3, July 2007. Such a method simulates an inextensible cloth (while other draping algorithms require a certain amount of elasticity, even if it is unphysical) by imposing dimensional constraints on the length of the edges of the mesh elements of the cloth model. Advantageously, step d uses a modified version of this method, wherein "strict" dimensional constraints are replaced by intervals: at each iteration of the iterative simulation, the length of each element edge must remain within a preset interval $[L_{min}, L_{max}]$; whenever an edge length leaves this range, a constraint is applied to bring it to the closer edge of this interval—see the PhD thesis of Adrian Rony Goldenthal "Implicit Treatment of Constraints for Cloth Simulation", The Hebrew University of Jerusalem, March 2010.

In step d of the inventive method, the width of the interval may progressively narrowed during the simulation in order to bring the length of each edge element toward its target value.

At the end of the draping, a garment is obtained which is as close as possible to the originally designed one (FSG), while being fully manufacturable and thus realistic in terms of the physical nature of cloth. Interestingly, the inventive method provides at the same time a realistic representation of the finished garment, the corresponding set of flat patterns and the positioning and stitching information (i.e. the information on how the patterns should be positioned around the manikin, and of which sides should be stitched together).

If the garment designer is satisfied with the result of the draping simulation, the garment can be directly produced (and/or its digital model can be used in computer graphics or virtual reality applications). Otherwise, he/she can proceed iteratively, by modifying the free shape FSG and executing the whole method again. Alternatively, he/she can directly modify the flattened patterns and directly see the effect on the final garment—possibly using a different, more conventional design tool.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 3:
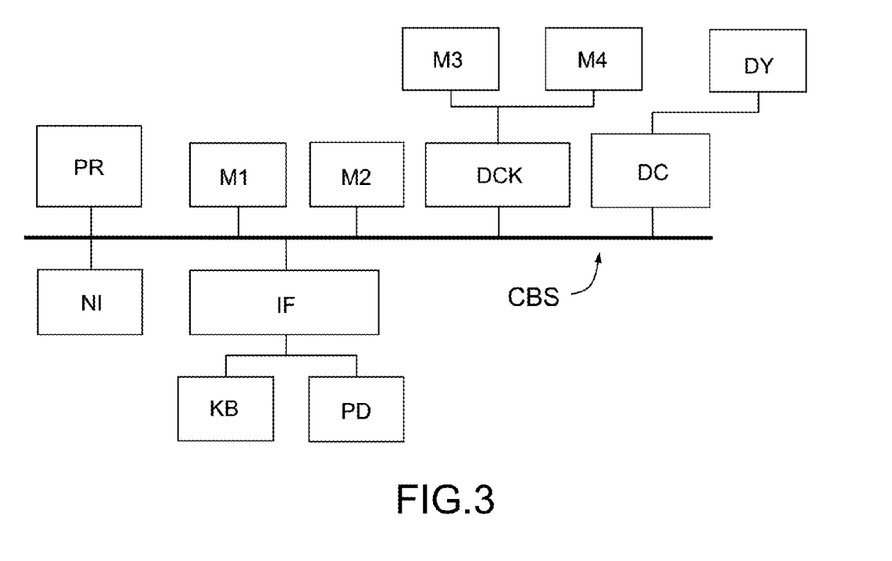
FIGS. 3 and 4 are block diagrams of respective computer systems suitable for carrying out a method according to an embodiment of the invention.

A computer—more precisely a computer aided design station—suitable for carrying out a method according to an exemplary embodiment of the present invention is described with reference to FIG. 3. In FIG. 3, the computer includes a Central Processing Unit (CPU) PR which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. A manikin or avatar database—i.e. organized sets of digital models of manikin or avatars in a form suitable to be processed by the executable program according to the inventive method—may also be stored on one or more of memory devices M1 to M4, or remotely. A database of garment models, in the form of free 3D shapes ready to be modified by the user, may also be stored on one or more of said memory devices.

The claimed invention is not limited by the form of the computer-readable media on which the computer-readable instructions and/or the database(s) of the inventive process are stored. For example, the instructions and databases can be stored on CDs, DVDs, in FLASH memory, RAM, ROM, PROM, EPROM, EEPROM, hard disk or any other information processing device with which the computer aided design station communicates, such as a server or computer. The program and the database can be stored on a same memory device or on different memory devices.

Further, a computer program suitable for carrying out the inventive method can be provided as a utility application, background daemon, or component of an operating system, or combination thereof, executing in conjunction with CPU PR and an operating system such as Microsoft VISTA, Microsoft Windows 7, UNIX, Solaris, LINUX, Apple MAC-OS and other systems known to those skilled in the art.

CPU PR can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize.

Further, the CPU can be implemented as multiple processors cooperatively working to perform the computer-readable instructions of the inventive processes described above.

The computer aided design station in FIG. 3 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface.

Disk controller DKC connects HDD M3 and DVD/CD M4 with communication bus CBS, which can be an ISA, EISA, VESA, PCI, or similar, for interconnecting all of the components of the computer aided design station.

A description of the general features and functionality of the display, keyboard, pointing device, as well as the display controller, disk controller, network interface and I/O interface is omitted herein for brevity as these features are known.

Figure 4:
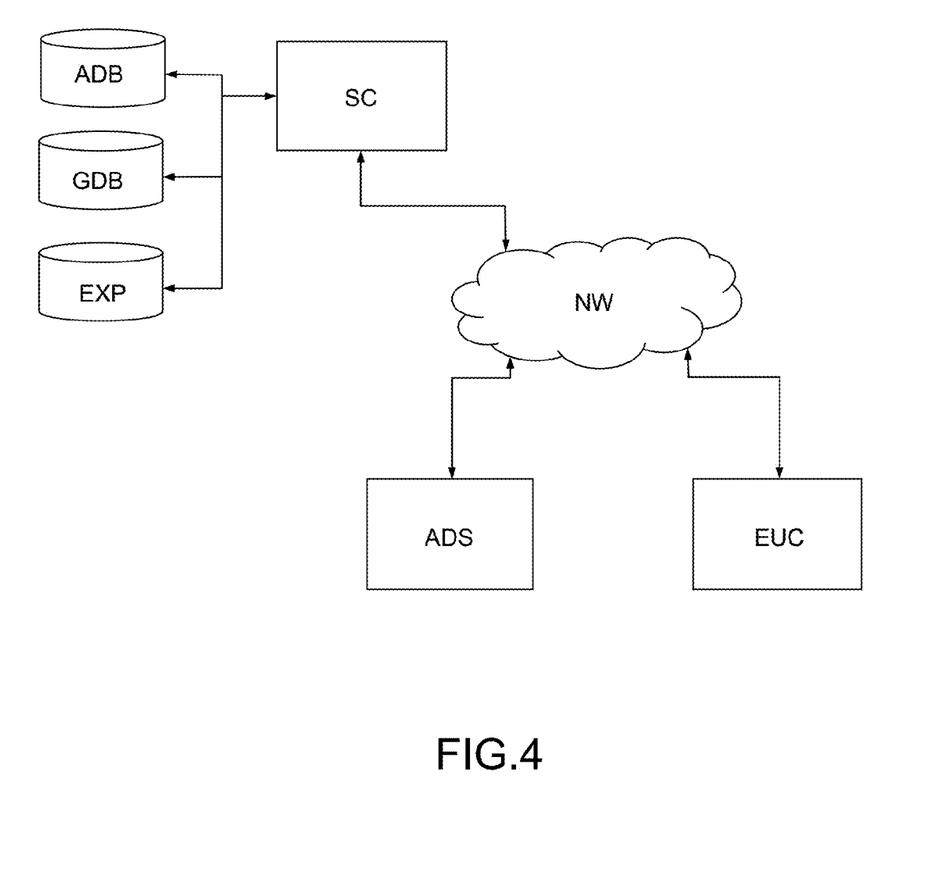

FIG. 4 is a block diagram of a computer system suitable for carrying out a method according to a different exemplary embodiment of the present invention.

In FIG. 4, the executable program EXP, the avatar or manikin database ADB and the garment database GDB are stored on memory devices connected to a server SC. The memory devices and the overall architecture of the server may be the same as discussed above with reference to FIG. 3, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 3, except that the memory devices of the administrator system and the end user computer do not store the executable program EXP, the manikin database ADB and the garment database GDB. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses the manikin and garment databases on the server via the network NW. This allows an end user to select a manikin and, possibly, a free 3D shape representing a garment from the respective databases, and modifying them if required. Alternatively, the user may only select a manikin and sketch the free 3D shape on it. The server performs the processing as described above with reference to FIGS. 1a to 1e and 2, and then transmits the flattened patterns and the draped, manufacturable garment model to the end user computer, again using the network NW.

Although only one administrator system ADS and one end user computer EUC are shown, the system can support any number of administrator systems and/or end user systems without limitation. Similarly, multiple servers, avatar databases and garment pattern databases can also be implemented in the system without departing from the scope of the present invention.

Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present invention.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for designing a manufacturable garment comprising the steps of:
    a) providing a digitally modeled three-dimensional shape (FSG) representing a garment, segmented into a set of three-dimensional panels (3DP, 3DP1, 3DP2, 3DP3, 3DP4), each of said three-dimensional panels being homeomorphic to a planar shape;
    b) computing, for each of said three-dimensional panels, a corresponding two-dimensional flattened pattern (FP2, FP3), and defining a bijection between points of each three-dimensional panel and of the corresponding two-dimensional flattened pattern;
    c) defining a mesh (MF, M3D) on each of said three-dimensional panel and two-dimensional flattened pattern, the meshes on each of the three-dimensional panels and on the corresponding two-dimensional flattened pattern being related by said bijection; and
    d) simulating, automatically by a computer using a constraint-based solver, a draping of the digitally modeled and segmented three-dimensional shape over a digitally modeled three-dimensional manikin (MK) by progressively imposing a constraint that lengths of edges of each mesh element (ME3) of said three-dimensional panels (3DP) adopt dimensions (EEL) of a corresponding mesh element (MEF) of the corresponding two-dimensional flattened pattern while it conforms to the manikin shape.

2. The method of claim 1, wherein step a) comprises:
    a1) a sub-step of providing a digitally modeled three-dimensional shape representing said garment;
    a2) a sub-step of segmenting said digitally modeled three-dimensional shape into said set of three-dimensional panels.

3. The method of claim 1, wherein step b) is carried out automatically by a computer using a method chosen among Angle Based Flattening and Least Squares Conformal Maps.

4. The method of claim 1, wherein step b) comprises, after the computing of said two-dimensional flattened patterns (FP2, FP3), a post-processing sub-step of deforming them by imposing a common length, or a predetermined length ratio, to sides (S2, S3) of two-dimensional flattened patterns which correspond to contacting sides of two adjacent three-dimensional panels, representing seams of said garment.

5. The method of claim 4, wherein said post-processing sub-step is performed by simulating an elastic deformation of at least some of said two-dimensional flattened patterns while imposing a length value to at least one side of each of said patterns using multi-point constraints.

6. The method of claim 1, wherein step c) comprises defining a quadrangular mesh (MF, M3D) on each of said three-dimensional panels and two-dimensional flattened patterns.

7. The method of claim 1, wherein step c) comprises defining a mesh (MF) on each of said two-dimensional flattened patterns, then defining a corresponding mesh (M3D) on the corresponding three-dimensional panel using said bijection.

8. The method of claim 1, wherein the constraint-based solver is a constraint-based iterative solver.

9. The method of claim 1, wherein step d) comprises initializing said constraint-based iterative solver by positioning each said three-dimensional panel (3DP) on its original position in the digitally modeled three-dimensional shape (FSG) representing the garment.

10. The method of claim 1, wherein said constraints on the lengths of edges of mesh elements (ME3) of said three-dimensional panels (3DP) are expressed by length intervals having boundaries which are modified over successive iterations to progressively impose that each of said element edges adopts the length (EEL) of a corresponding edge of the corresponding two-dimensional flattened pattern.

11. A computer program product, comprising:
    a non-transitory computer-readable data-storage medium (M1-M4); and
    computer-executable instructions stored on the computer-readable data-storage medium and configured to cause a computer system to automate implementing designing of manufacturable garments by:
    a) providing a digitally modeled three-dimensional shape (FSG) representing a garment, segmented into a set of three-dimensional panels (3DP, 3DP1, 3DP2, 3DP3, 3DP4), each of said three-dimensional panels being homeomorphic to a planar shape;
    b) computing, for each of said three-dimensional panels, a corresponding two-dimensional flattened pattern (FP2, FP3), and defining a bijection between points of each three-dimensional panel and of the corresponding two-dimensional flattened pattern;
    c) defining a mesh (MF, M3D) on each of said three-dimensional panel and two-dimensional flattened pattern, the meshes on each of the three-dimensional panels and on the corresponding two-dimensional flattened pattern being related by said bijection; and
    d) simulating, automatically by a computer using a constraint-based solver, a draping of the digitally modeled and segmented three-dimensional shape over a digitally modeled three-dimensional manikin (MK) by progressively imposing a constraint that lengths of edges of each mesh element (ME3) of said three-dimensional panels (3DP) adopt dimensions (EEL) of a corresponding mesh element (MEF) of the corresponding two-dimensional flattened pattern while it conforms to the manikin shape.

12. A non-transitory computer-readable data-storage medium (M1-M4) comprising:

computer-executable instructions to cause a computer system to automate designing manufacturable garments, including causing the computer system to:
a) provide a digitally modeled three-dimensional shape (FSG) representing a garment, segmented into a set of three-dimensional panels (3DP, 3DP1, 3DP2, 3DP3, 3DP4), each of said three-dimensional panels being homeomorphic to a planar shape;
b) compute, for each of said three-dimensional panels, a corresponding two-dimensional flattened pattern (FP2, FP3), and defining a bijection between points of each three-dimensional panel and of the corresponding two-dimensional flattened pattern;
c) define a mesh (MF, M3D) on each of said three-dimensional panel and two-dimensional flattened pattern, the meshes on each of the three-dimensional panels and on the corresponding two-dimensional flattened pattern being related by said bijection; and
d) simulate, automatically by a computer using a constraint-based solver, a draping of the digitally modeled and segmented three-dimensional shape over a digitally modeled three-dimensional manikin (MK) by progressively imposing a constraint that lengths of edges of each mesh element (ME3) of said three-dimensional panels (3DP) adopt dimensions (EEL) of a corresponding mesh element (MEF) of the corresponding two-dimensional flattened pattern while it conforms to the manikin shape.

13. A Computer Aided Design system comprising:
a processor coupled to a memory and a graphical user interface (IF), the memory storing computer-executable instructions to cause the Computer Aided Design system to design manufacturable garments by:

a) providing a digitally modeled three-dimensional shape (FSG) representing a garment, segmented into a set of three-dimensional panels (3DP, 3DP1, 3DP2, 3DP3, 3DP4), each of said three-dimensional panels being homeomorphic to a planar shape;
b) computing, for each of said three-dimensional panels, a corresponding two-dimensional flattened pattern (FP2, FP3), and defining a bijection between points of each three-dimensional panel and of the corresponding two-dimensional flattened pattern;
c) defining a mesh (MF, M3D) on each of said three-dimensional panel and two-dimensional flattened pattern, the meshes on each of the three-dimensional panels and on the corresponding two-dimensional flattened pattern being related by said bijection; and
d) simulating, automatically by a computer using a constraint-based solver, a draping of the digitally modeled and segmented three-dimensional shape over a digitally modeled three-dimensional manikin (MK) by progressively imposing a constraint that lengths of edges of each mesh element (ME3) of said three-dimensional panels (3DP) adopt dimensions (EEL) of a corresponding mesh element (MEF) of the corresponding two-dimensional flattened pattern while it conforms to the manikin shape.

14. A method of manufacturing a garment comprising:
designing said garment using a method according to claim 1; and
physically manufacturing said garment, including cutting and assembling planar patterns corresponding to the flattened two-dimensional patterns (FP).

\* \* \* \* \*